United States Patent
Nystuen et al.

[11] 3,879,657
[45] Apr. 22, 1975

[54] ELECTRICAL APPARATUS FOR MINIMIZING POLARIZATION OF CONDUCTIVITY CELL ELECTRODES

[75] Inventors: Marcus I. Nystuen; Roger A. Johnson, both of St. Paul, Minn.

[73] Assignee: Economics Laboratory, Inc., St. Paul, Minn.

[22] Filed: Dec. 21, 1973

[21] Appl. No.: 427,082

Related U.S. Application Data

[63] Continuation of Ser. No. 282,957, Aug. 23, 1972, abandoned.

[52] U.S. Cl. .............................................. 324/30 R
[51] Int. Cl. ........................................... G01n 27/42
[58] Field of Search ........................ 324/30 R, 30 B

[56] References Cited
UNITED STATES PATENTS

| | | |
|---|---|---|
| 2,651,751 | 9/1953 | Heath ................................. 324/30 B |
| 2,928,406 | 3/1960 | Cunniff et al. ................ 324/30 B X |
| 3,320,529 | 5/1967 | Vreeland et al. ............... 324/30 B X |

*Primary Examiner*—Alfred E. Smith
*Assistant Examiner*—Rolf Hille

[57] ABSTRACT

Electrical apparatus for reducing the drift in the set point of an electrical bridge type conductivity sensor utilizing a pulse producing circuit (e.g. an astable multivibrator type switching device) to provide an AC voltage of very short duration to the conductivity cell electrodes for minimizing the cumulative polarization thereof. Pulse lengthening circuitry is also provided to assure that the relatively short output pulses from the bridge circuit are of sufficient duration to properly operate apparatus for injecting an additive product into the conductive medium.

6 Claims, 4 Drawing Figures

3,879,657

ELECTRICAL APPARATUS FOR MINIMIZING POLARIZATION OF CONDUCTIVITY CELL ELECTRODES

This is a continuation of application Ser. No. 282,957, filed Aug. 23, 1972, now abandoned.

BACKGROUND OF THE INVENTION

1. Field of the Invention

The present invention pertains to electrical apparatus for reducing the polarization of conductivity cell electrodes.

2. Description of the Prior Art

In numerous instances, it is either necessary or highly desirable to measure the electrolytic conductivity (i.e. specific conductance) of a particular medium. For example, a conductivity sensor is often times utilized to control switching circuits which in turn control solenoid valves or the like to feed one or more additive materials into the conductive medium. Other applications for conductivity sensors, such as measuring the conductivity of water in a salinity-indicating system or of an electolyte in various chemical processes, are also well known.

A conductivity sensor determines the conductivity of a medium by measuring its ability to carry an electric current. Generally speaking, there are two types of conductivity sensors presently available; an electrical bridge-type and a direct reading meter-type. Typically, the electrical bridge-type conductivity sensor is utilized where high accuracy and stability is required while the requirement of direct display necessitates utilization of the direct reading meter-type sensor. Historically, both of these types of conductivity sensors have utilized a conductivity cell consisting of two metal plates or electrodes fixedly positioned in a spaced relationship within an insulating chamber which serves to isolate a portion of the conductive medium. This arrangement renders the measured resistance generally independent of sample volume.

A severe disadvantage of the aformentioned conductivity sensors is the inaccuracy in measurement introduced as a result of the polarization of the electrodes while in use (i.e. the deposit of a gaseous film on each electrode). This is especially true in the case of a balanced bridge-type sensor wherein the polarization of the electrodes causes a drift in the set point of the bridge resulting in inaccurate readings particularly when measuring a high conductivity medium.

Numerous attempts to minimize this error have been made. One approach is to use relatively small, distantly spaced electrodes coated with a deposit of platinum black. However, the platinum coating typically deteriorates with time necessitating manual cleaning and re-platinizing of the electrodes on a generally continuous basis. This of course requires a great amount of manual labor and, while it is the approach most commonly followed, it is generally undesirable. Additionally, it has been found that the utilization of a high bridge frequency (e.g. 1,000–3,000 Hertz) is desirable when measuring low resistances (i.e. high conductivities). However, even the utilization of such high frequencies has not entirely eliminated the error in measurement and, in addition, the capacitance of the measuring system must be continuously adjusted to maintain the bridge at its set point as the numerous operation parameters vary. Finally, apparatus has been developed for measuring the conductivity of an electrolyte in which the spaced electrodes are replaced by two insulated coils with toroidal cores arranged in a coaxial and predetermined spatial relationship. In this apparatus, the driver coil induces an electrical current in the electrolyte and the pickup coil is energized by the magnetic and electric field of the driver coil as well as by the current flowing in the electrolyte. See, for example, the conductivity measuring apparatus described and claimed in U.S. Pat. No. 2,542,057. While this approach generally eliminates the error in measurement occurring as a result of cell polarization, it is an extremely expensive approach and, for this reason, is not practical for many applications.

SUMMARY OF THE INVENTION

The present invention pertains to a conductivity sensor unit including a pair of electrodes immersible in a medium for determining the conductance therebetween. A current switching means is provided for interrupting the current flow to the electrodes so that the electrodes have a voltage periodically applied thereto for only a short time interval. For example, the period during which voltage is applied across the electrodes is preferably exceeded by the period during which no voltage is applied by a factor of about 1 to 10–100. Pulse lengthening circuitry is also provided to lengthen the short output pulses from the conductivity sensing means to assure that the final output pulse train is of sufficient duration to properly operate product injection apparatus, an alarm module, a recorder, or similar apparatus.

The periodic application of voltage to the electrode cells for only short periods of time has been found to significantly reduce the occurrence of polarization. Thus, in the electrical bridge-type conductivity sensor, the drift of the set point is substantially reduced and exceedingly more accurate readings are obtained. This reduction in cell polarization is achieved by virtue of the fact that the polarization occurs only during the period when electrical power is supplied to the electrode cells and, in the present invention, means have been provided to significantly reduce this period. During the period when no voltage is applied across the electrodes, the electrodes generally return to their original state of non-polarization so, by the time the succeeding AC pulses are applied to the electrodes, the bridge has normally returned to its original set point (or very nearly so). As will be readily appreciated from the following Detailed Description, the present circuitry is of relatively simple design and the construction thereof does not necessitate undue expense. Further, the circuitry is extremely reliable and essentially maintenance free over extended periods of operation.

DETAILED DESCRIPTION OF THE PREFERRED EMBODIMENT

Figure 1:
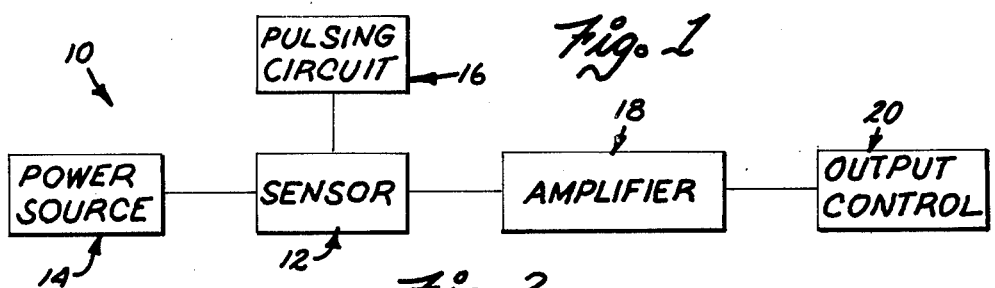
FIG. 1 is a block diagram of the present conductivity sensing apparatus.

Referring now to the drawings, the numeral 10 generally designates the conductivity sensing apparatus provided by the present invention. As shown, the apparatus 10 includes a conductivity sensor 12 having power supplied thereto from an alternating current power source 14. Conductivity sensor 12 is an electrical bridge-type sensor having one arm of the bridge defined by a pair of electrodes (shown in FIG. 3) immersed within the conducting medium. However, it should be understood that the present invention can find application in conjunction with any electrode-type-conductivity sensor (e.g., conductivity sensing circuits utilizing voltage dividers and constant current type ohm meter circuits). As explained subsequently in greater detail, the electrical power or current supplied to sensor 12 from power source 14 is periodically switched by switching or pulsing circuit means 16 such that the period during which voltage is applied across the cell electrodes is preferably of much shorter duration than the period during which no power is applied to the electrodes. The output signal from the bridge circuit (i.e., variations from the bridge set point during application of the switched voltage to the cell electrodes) is amplified by amplification means 18 and then transmitted to output control means 20. The output control means 20 lengthens the relatively short output pulses from the conductivity sensor 12 so that the length thereof is sufficient to properly operate suitable apparatus for injecting one or more additives into the conducting medium or solution. The lengthened output pulses can also be utilized to operate an alarm module, a recorder, or the like.

Figure 2:
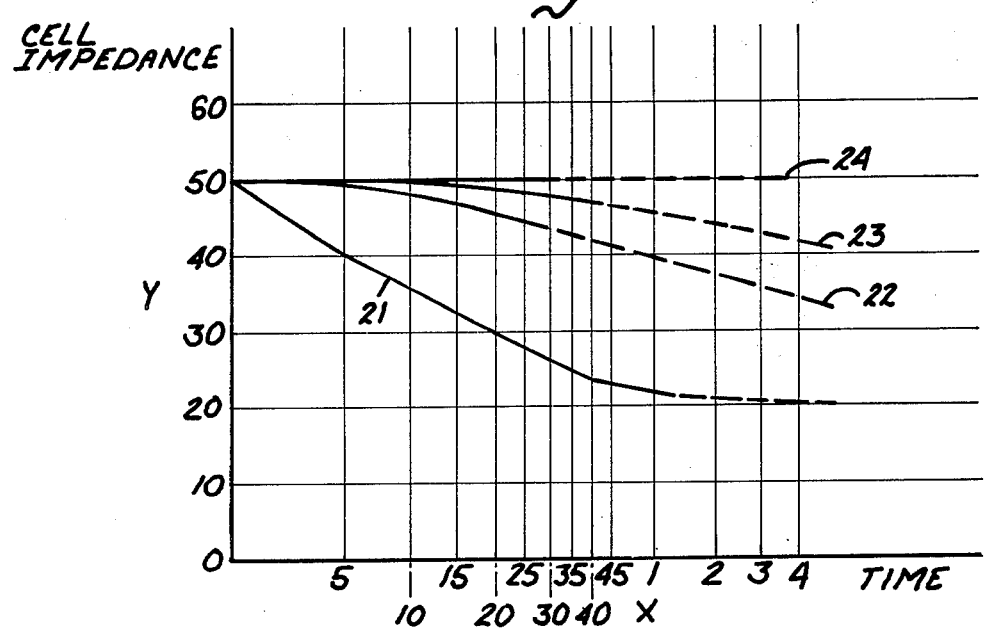
FIG. 2 is a graph showing changes in the resistance between the conductivity cell electrodes with variations in the ratio of the length of time during which voltage is applied between the conductivity cell electrodes to the length of time during which no voltage is applied.

It has been experimentally found that the pulsing of the power supplied to the conductivity cell electrodes substantially reduces the occurrence of electrode polarization and the resulting drift in the set point of the bridge circuit. Experimental data illustrating the stabilization of the impedance across the conductivity cell electrodes with increasingly shorter periods of time during which voltage is applied across the cell electrodes is graphed in FIG. 2; the X axis logarithmically representing time (in minutes) and the Y axis representing the conductivity cell impedance (in arbitrary units). Changes in the impedance of the conductivity cell itself (i.e. without any change in the conductive medium) are proportional to the drift in the set point of the electrical bridge circuit.

Line 21 is drawn from data obtained by supplying a constant AC voltage across a pair of nickel electrodes immersed in a highly conductive medium. As shown, a significant change (decrease) in cell impedance occurs, particularly during the first hour of operation. This will give rise to an apparent increase in the conductance of the medium even though the medium remained unchanged. Line 22 represents the observed change in cell impedance over time upon periodic switching of the voltage applied to the cell electrodes; the voltage being periodically supplied to the cell electrodes for the same time interval as when switched off (i.e. a 1:1 ratio). In the Example illustrated, the voltage was periodically applied to the electrodes for 2½ minutes and then switched off for 2½ minutes. Line 23 illustrates the change in cell impedance over time with voltage periodically applied to the cell electrodes for only one-fourth as long a period as for when no voltage was applied (i.e. a 1:4 ratio). Here, voltage was periodically applied for one minute and then switched off for a four minute interval. Finally, line 24 represents the change in cell impedance over time with a voltage present between the cell electrodes for only one-tenth as long as when no voltage was present. As can be readily appreciated, the change (drift) in cell impedance over time decreases as the period of time during which voltage supplied to the electrodes decreases. In fact, very little change in cell impedance is observable in line 24. Further increases in the ratio of voltage "on" time to voltage "off" time (e.g. a 1:100 ratio) result in even less deviation of the cell impedance from its original value. Consequently, the bridge set point also remains stable.

Figure 3:
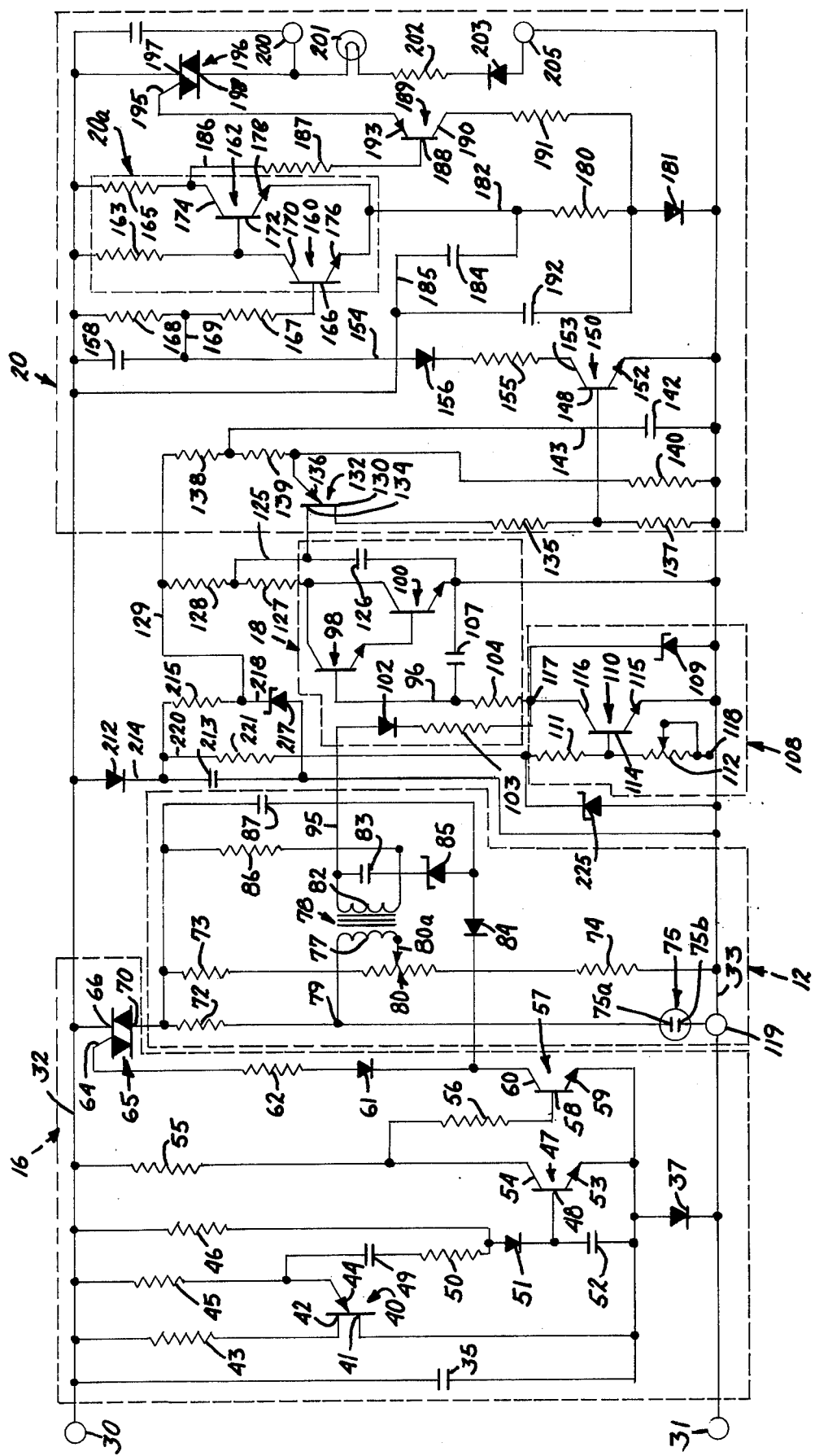
FIG. 3 is a schematic of a preferred electrical circuit for measuring the conductivity of a medium, including apparatus for providing a pulsing voltage to the conductivity cell electrodes.

Referring now to FIG. 3, a preferred conductivity measuring unit is illustrated. Here, a pair of terminals 30 and 31 are connectable to an AC power source (not shown) for supplying electrical power to the sensing circuit 12, pulsing circuit 16, amplifier 18 and output control circuit 20.

Specifically, pulsing circuit 16 is connected to the terminal 30 through a lead 32 and to terminal 31 through a lead 33. A capacitor 35 in series with a diode 37 are connected between leads 32 and 33 to form an unregulated DC power supply for the pulsing circuit 16. A unijunction transistor 40 has a base 41 connected to lead 33 through diode 37 and a base 42 connected to lead 32 through a resistor 43. An emitter 44 of unijunction transistor 40 is connected to lead 32 through a resistor 45 and to a base 48 of a NPN transistor 47 through a capacitor 49, a resistor 50, and a diode 51. Diode 51 and resistor 50 protect base 48 of transistor 51 from excessive negative voltages. The cathode side of diode 51 is also connected through a resistor 46 to lead 32. Base 48 of transistor 47 is connected to lead 33 through a capacitor 52 and diode 37. Transistor 47 further includes an emitter 53 connected to the lead 33 through diode 37 and a collector 54 connected through a resistor 55 to the lead 32. Transistors 40 and 47 with resistors 43, 45, and 46 and capacitor 49 form a conventional unijunction astable multivibrator with an asymetrical output. Resistor 50 stabilizes unijunction transistor 40 and limits the emitter current therethrough. Collector 54 of transistor 47 is also connected through a resistor 56 to a base 58 of a NPN transistor 57. An emitter 59 of transistor 57 is connected through the diode 37 to the lead 33 and a collector 60 of transistor 57 is connected through a diode 61 and a resistor 62 to a gate 64 of a triac 65. A number one main terminal 66 of triac 65 is connected directly to lead 32 and terminal 30. Transistor 57 and resistors 55 and 56 form an inverter network for inverting the squared output signal from transistor 47.

The periodic AC output signal from the pulsing circuit 16 is applied to the conductivity sensing unit 12 through triac 65 via a number two main terminal 70. As shown, sensing unit 12 includes an AC impedance bridge circuit consisting of resistors 72, 73, 74, and the impedance of the conductive medium between the electrodes 75a and 75b of a conductivity cell 75. A primary winding 77 of a transformer 78 is connected to a movable arm 80a of a potentiometer 80 and to a terminal 79 between resistor 72 and conductivity cell 75. The setting of potentiometer 80 determines the normal or set point of the bridge circuit about which the conductivity cell 75 varies. Preferably, this set point is substantially separated from the null point of the bridge such that the following described control action all occurs on the same side of null.

The output signals received by the primary winding 77 are induced in a secondary winding 82 of transformer 78. The transformer 78 has a step-up ratio of approximately 1 to 10 between the primary winding 77 and the secondary winding 82 so that it furnishes a degree of amplification for the output signal from the bridge circuit as well as isolating the bridge circuit from the remainder of the circuitry. A capacitor 83 is connected across the secondary transformer winding 82 to remove transients in the bridge output signal and to compensate for the capacitance of the conductive medium.

Transformer 78 couples the output of the bridge circuit of sensing unit 12 to a biasing circuit consisting of a diode 84, a zener diode 85, a resistor 85 and a capacitor 87. As shown, diode 84 has a cathode connected to the collector 60 of transistor 57 and its anode connected to the anode of zener diode 85. The cathode of zener 85 is connected to the secondary transformer winding 82. Resistor 86 is connected to the same end of transformer secondary winding 82 as zener 85 and to the number two main terminal 70 of triac 65. This provides switching of the biasing circuit by pulsing circuit 16 simultaneous with the application of power to conductivity cell 75. Capacitor 87 shunts resistor 86 and zener 85. This biasing circuit provides a biasing signal which is summed with the output signal from the bridge circuit to provide a resultant signal for firing the amplification circuit 18 dependent on the amplitude of the bridge output signal in the manner described and claimed in U.S. Pat. No. 3,680,070; which is assigned to the same assignee as the present invention.

The summed bridge output and biasing signals are transmitted via a pair of leads 95 and 96 to amplification circuit 18 comprising a first transistor 98 and a second transistor 100 connected as a conventional Darlington pair. A diode 102 and a resistor 103 are positioned in lead 95 and a resistor 104 is positioned in lead 96 and connected to the base of transistor 98. A capacitor 107 is connected between the emitter of transistor 100 and lead 96 so as to shunt any transients appearing at the base of transistor 98 which may be caused by the periodic switching of pulsiing circuit 16.

A temperature compensating circuit, generally designated 108, is provided to compensate for apparent changes in the conductivity resulting from changes in the temperature of the conductive medium. Circuit 108 includes a zener diode 109, a NPN transistor 110, a resistor 111, a potentiometer 112, and a thermistor (not shown). The base 114 of transistor 110 is connected between resistor 111 and potentiometer 112. An emitter 115 of transistor 110 is connected directly to lead 33. A collector 116 is connected to leads 95 and 96 at terminal 117. Zener diode 109 is connected across transistor 110. The thermistor (not shown) is connected between terminals 118 and 119 and is immersed in the conductive medium. The thermistor senses changes in the temperature of the conductive medium causing a corresponding change in the voltage at base 114 turning transistor 110 partially on, at a preselected temperature determined by adjustment of potentiometer 112, and thereby shunting a portion of the bridge output signal appearing at collector 116 of transistor 110. This provides temperature compensation equal to approximately 2 percent per degree centigrade for the first 10°C. decrease in temperature and greater compensation for any additional decrease in temperature until transistor 110 shunts the entire bridge output signal beginning with a decrease in temperature of approximately 20°C. The zener diode 109 protects the collector-emitter junction of transistor 110 from excessive voltage.

The amplification circuit 18 is connected to the output control circuit 20 via a lead 125 which is connected to the collectors of transistors 98 and 100 through a resistor 127 and to a base 134 of a unijunction transistor 132. Lead 125 is also connected to a lead 129 through a resistor 128 and through a capacitor 126 to the emitter of transistor 100 which is, in turn, connected to lead 33. Lead 129 is connected through a series of resistors 138, 139 and 140 to lead 33. A base 130 of transistor 132 is connected through a pair of resistors 135 and 137 to lead 33. An emitter 136 of transistor 132 is connected through the resistor 139 and a capacitor 142 in a lead 143 to lead 33. A base 148 of a NPN transistor 150 is connected between the resistors 135 and 137. An emitter 152 of transistor 150 is connected directly to lead 33 and a collector 153 is connected to lead 32 via a lead 154 through a resistor 155, a diode 156 and a capacitor 158.

The output signal from transistor 150 is transmitted to a conventional Schmitt trigger arrangement 20a consisting of transistors 160 and 162 and resistors 163 and 165. As shown, the base 166 of transistor 160 is connected through a pair of resistors 167 and 168 to the lead 32. A lead 169 is connected between resistors 167 and 168 and to the lead 154. A collector 170 of transistor 160 is connected through resistor 163 to lead 32 and to a base 172 of transistor 162. The collector 174 of transistor 162 is connected through resistor 165 to lead 32. Emitters 176 and 178 of transistors 160 and 162, respectively, are interconnected. A resistor 180 and a diode 181 are positioned in a lead 182 connecting emitters 176 and 178 to the lead 33. A capacitor 184 in a lead 185 is connected between lead 182 and lead 132 to provide filtering for the Schmitt trigger arrangement 20a. Resistors 163, 165, 167, 168 and 180 are preferably chosen to require about a 10 volt differential at the base 166 of transistor 160 to switch the Schmitt trigger 20a.

The signal at the collector 174 of transistor 162 is transmitted via a lead 186 through a resistor 187 to a base 188 of a PNP transistor 189. A collector 190 of transistor 189 is connected through a resistor 191 to the lead 182 at a junction between resistor 180 and diode 181, and through a capacitor 192 to the lead 185. Finally, an emitter 193 of transistor 189 is connected to a gate 195 of a triac 196. A number one main terminal 197 of triac 196 is connected directly to lead 32. A Number two main terminal 198 of triac 196 is connected to a terminal 200, a light bulb 201, a resistor 202, a diode 203 and a terminal 205 which is, in turn, connected to lead 33. An external load (e.g. solenoid apparatus for operating a product injection system, an alarm module, a recorder or similar apparatus) is connected between terminals 200 and 205. A capacitor 208 is connected in parallel with triac 196 for suppressing transients from inductive external loads. DC drive for triac 196 is obtained through transistor 189 and resistor 191. Diode 203 and resistor 202 provide a 12 volt voltage supply for load indicator light 201.

Finally, a DC power supply is provided for the temperature compensating circuit 108, the amplification circuit 18, and the output control circuit 20. This power supply circuit includes a diode 212 and a capacitor 213 positioned in a lead 214 connected between leads 32 and 33. A resistor 215 and a zener diode 217 are positioned in a lead 218 and shunt the capacitor 213. Lead 129 is connected to lead 218 between resistor 215 and zener 217. A lead 220 is connected to lead 218 and through a resistor 221 and resistor 111 to the base 114 of transistor 110. A zener diode 225 shunts resistors 111 and 112 (and the thermistor) and provides filtering for the temperature compensating circuit 108 and is protected from excessive current by the limiting resistor 221. Zener diode 217 provides the same function for the pulse control circuit 20 and is protected from excessive current by limiting resistor 215.

Typical examples of component values for the conductivity sensing apparatus provided by the present invention utilizing a 24 volt AC power source are listed below.

| COMPONENT | | VALUE | |
|---|---|---|---|
| Resistor | 43 | 1,000 | Ohms |
| | 45 | 560,000 | |
| | 46 | 6,800 | |
| | 50 | 1,000 | |
| | 55 | 10,000 | |
| | 56 | 15,000 | |
| | 62 | 270 | |
| | 72 | 560 | |
| | 73 | 1,500 | |
| | 74 | 150 | |
| | 80 | 200 | |
| | 86 | 100,000 | |
| | 103 | 1,000,000 | |
| | 104 | 1,000,000 | |
| | 111 | 12,000 | |
| | 112 | 200 | |
| | 127 | 680 | |
| | 128 | 1,000 | |
| | 135 | 820 | |
| | 137 | 150 | |
| | 138 | 120,000 | |
| | 139 | 1,200 | |
| | 140 | 220,000 | |
| | 155 | 27 | |
| | 163 | 56,000 | |
| | 165 | 3,900 | |
| | 167 | 220,000 | |
| | 168 | 560,000 | |
| | 180 | 10,000 | |
| | 187 | 3,300 | |
| | 191 | 470 | |
| | 202 | 39 | |
| | 215 | 680 | |
| | 221 | 1,000 | |
| Capacitor | 35, 142, 184, 192, 213 | 50 | Microfarads |
| | 49 | 8 | |
| | 52, 107 | .03 | |
| | 83, 208 | .1 | |
| | 87, 126 | .47 | |
| | 158 | 10 | |
| Diodes | 37, 51, 61, 84, 102, 156, 181, 203, 212 | 1N2482 | |
| Zener Diode | 85 | 1N5240 | |
| Zener Diodes | 109, 217, 225 | 1N5250 | |
| Transistors | 47, 57, 98, 100, 110, 150, 160, 162 | 2N5172 | |
| Transistor | 189 | 2N4402 | |
| Unijunction Transistor | 40, 132 | 2N4871 | |
| Triacs | 65, 196 | A01002 | |

The operation of the above circuitry can be described as follows. With AC power supplied between terminals 30 and 31, the unijunction transistor 40 remains in its non-conducting state and transistor 47 in its conducting state until capacitor 49 charges to the unijunction emitter peak point voltage. The charging time is determined primarily by the values of resistor 45 and capacitor 49. Upon capacitor 49 reaching the emitter peak point voltage, transistor 40 is switched to its conducting state discharging capacitor 49 through the emitter-base 41 junction of transistor 40. This results in a negative pulse at the base 48 of NPN transistor 47 switching this transistor into its nonconducting state. Transistor 47 remains off until capacitor 49 discharges to a voltage at which the emitterbase junction of transistor 47 is again forward biased, beginning the next cycle. The time period during which transistor 47 remains in its non-conducting state is determined primarily by the values of resistor 46 and capacitor 49. Transistor 57 functions as an inverter for the output signal from transistor 47 and, with transistor 57 conducting, DC drive for triac 64 is provided through diode 61 and resistor 62, switching triac 64 to its conducting state so as to provide an AC voltage to the electrical bridge circuit. For the component values given above, an input signal is transmitted to the bridge circuit for 1/15 – 1/12 of a second (i.e. 4–5 cycles) for each 8–12 second time interval. Thus, an AC voltage is periodically present between the electrodes 75a and 75b of conductivity cell 75 for a relatively short interval of time. In the preferred embodiment described, the ratio of the period during which voltage is applied to conductivity cell 75 to the time period during which no voltage is present is about 1:100. Other ratios can, of course, be selected.

As described in the above-mentioned U.S. Pat. No. 3,680,070, the biasing platform provided by the biasing circuit comprising diode 84, Zener 85, resistor 86 and capacitor 87 has a voltage level greater than the signal level necessary to switch amplifier 18 into its conducting state whenever pulsing circuit 16 provides power thereto. However, the output or control signal from the bridge circuit is summed with (i.e. "bucks") this biasing platform; the set point of the bridge being chosen so that the control signal normally cancels the biasing platform and so that, when the conductivity of the conductive medium decreases, the control signal decreases in amplitude allowing the biasing signal to switch amplifier 18 into its conducting state.

Before amplification circuit 18 is switched to its conducting state, the capacitor 142 is charged through resistor 138. Resistors 139 and 140 limit the charge on capacitor 142 to a voltage at emitter 136 of transistor 132 slightly less than the triggering voltage for the transistor. However, whenever amplifier 18 is switched to its conducting state, the voltage at base 134 of unijunction transistor 132 decreases, causing transistor 132 to conduct. With transistor 132 conducting, capacitor 142 discharges through resistors 139, 135 and 137; the resulting output signal being applied to base 148 of transistor 150 and of such amplitude to switch transistor 150 into its conducting mode. Use of the above-given component values will provide a pulse of sufficient amplitude and duration to maintain transistor 150 in its conducting state for 2–3 half cycles. The capacitor 126 in lead 125 and resistor 128 integrate the amplifier output signal and prevent transistor 150 from being switched to its conducting state near the cut off voltages for transistors 98 and 100. Diode 156 prevents charging of capacitor 158 through the base-collector junction of transistor 150.

With transistor 150 in its non-conducting state, transistor 160 is biased in its conducting state through resistors 167 and 168 and transistor 162 is biased in its non-conducting state. However, when transistor 150 is switched to its conducting state, as above-described, capacitor 158 charges through current limiting resistor 155 and diode 156 lowering the voltage at base 166 of transistor 160 and switching transistor 160 off and, concurrently, switching transistor 162 into its conducting state. Then, when transistor 150 is again switched to its non-conducting state, capacitor 158 discharges through resistor 167 increasing the voltage at the base 166 of transistor 160 until transistor 160 is returned to its conducting state and transistor 162 is switched off. For the component values given above, the discharge time of capacitor 158 is about 20 seconds. Thus, transistor 162 is maintained in its conducting state for a time period during which at least two successive AC input pulses are transmitted to conductivity cell 75 from pulsing circuit 16.

Finally, the drive transistor 189 is switched to its conducting state whenever transistor 162 is conducting providing DC drive to the gate 195 of triac 196. With triac 196 in its conducting state, power is present between the terminals 200 and 205 so as to drive an external load connected thereacross. Load indicating light 201 is also lit during this time interval. For the component values given above, power is present between terminals 200 and 205 for a minimum period of 20 seconds and for longer intervals whenever the output pulses from conductivity sensor 12 are of sufficient magnitude to switch amplifier 18 as previously described.

Figure 4:
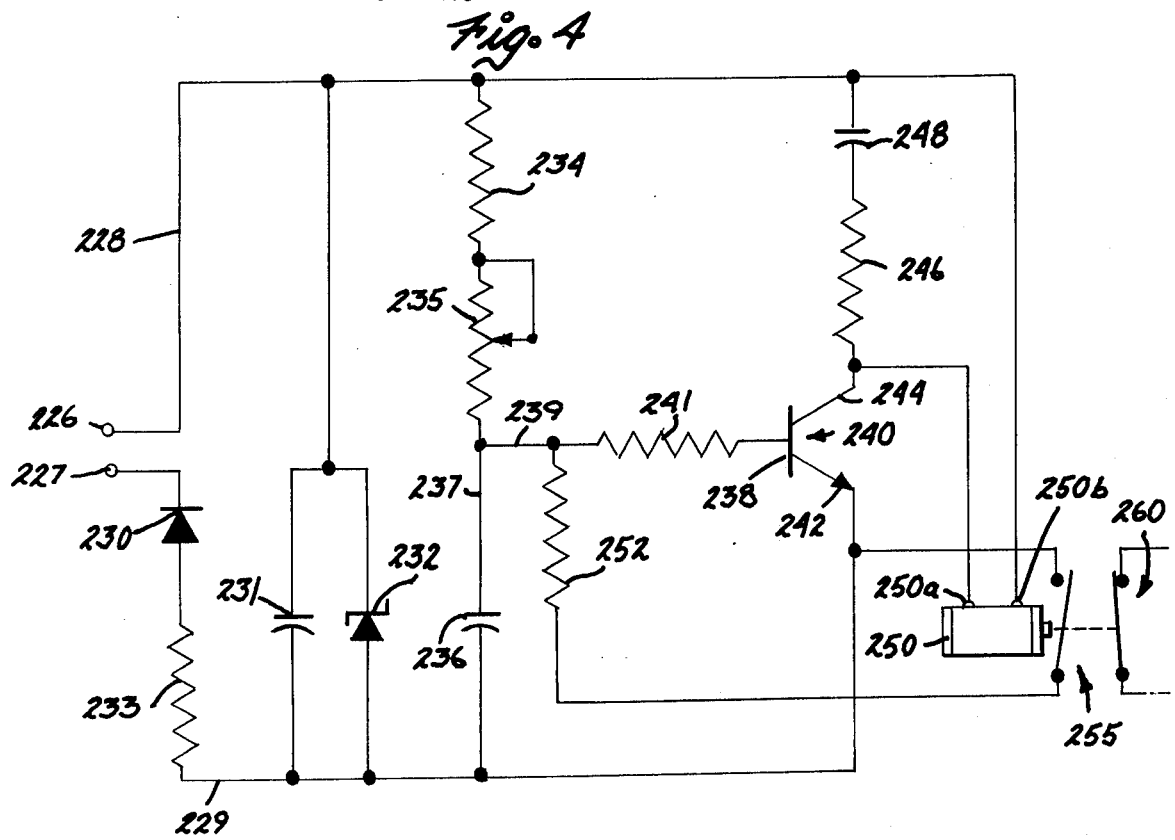
FIG. 4 is a schematic of an alternative embodiment of an electrical circuit for providing a pulsing signal to the conductivity cell electrodes.

Numerous alternative means are available for switching the current supplied to the bridge circuit such that a voltage is periodically present across the electrodes 75a and 75b of conductivity cell 75 for only very short intervals. One such circuit is illustrated in FIG. 4. In this embodiment, a 24 volt AC power source (not shown) is connected across a pair of terminals 226 and 227 which are in turn connected to electrical leads 228 and 229, respectively. A diode 230 positioned in lead 229, a capacitor 231 and a zener diode 232 provide a 20 volt voltage across the pulse timing circuit subsequently described. As shown, the capacitor 231 and zener diode 232 are connected in parallel with one another between leads 228 and 229. A resistor 233 in lead 229 functions as a current limiting resistor for zener diode 232. A resistor 234, a potentiometer 235 and a capacitor 236 are connected in series in a lead 237 extending between the leads 228 and 229. A base 238 of a transistor 240 is connected via a lead 239 through a resistor 241 to lead 237 between potentiometer 235 and capacitor 236. An emitter 242 of transistor 240 is connected directly to the lead 229 and a collector 244 is connected to the lead 228 through a resistor 246 and a capacitor 248. Collector 244 is also connected to a first terminal 250a on an electrical solenoid 250. A second terminal 250b on solenoid 250 is connected directly to the lead 228. A resistor 252 has one end connected to the lead 239 and a second end connected through a switch 255 to the lead 229. Solenoid 250 operates switch 255 moving the switch to its closed position upon energization of the solenoid. Solenoid 250 also operates a switch 260 which is normally positioned in its closed position so as to shunt the electrodes 75a and 75b of the conductivity cell 75.

An example of component values for the above-described alternative pulsing circuit are as follows:

| COMPONENT | VALUE | |
|---|---|---|
| Resistor 233 | 220 | Ohms |
| 234 | 10,000 | |
| 235 | 100,000 | |
| 241 | 100,000 | |
| 246 | 68 | |
| 252 | 150 | |
| Capacitor 231 | 175 | Microfarads |
| 236 | 175 | |
| 248 | 50 | |
| Diode 230 | 1N2482 | |
| Zener Diode 232 | 1N5250 | |
| Transistor 240 | 2N3417 | |
| Relay Coil 250 | 2500 | Ohms |

In operation, a 24 volt AC power source is connected across terminals 226 and 227 charging capacitor 236 until the voltage at base 238 of transistor 240 is sufficiently positive to switch transistor to its conducting state. The time interval which elapses before transistor 240 is switched to its conducting state is determined primarily by the values of capacitor 236 and resistors 234 and 235. Upon switching of transistor 240 to its conducting state, the solenoid 250 is energized closing switch 255 and opening switch 260. With switch 255 closed, capacitor 236 discharges through resistor 252 resetting the circuitry for the succeeding cycle. Additionally, with switch 260 open, voltage is applied across conductivity cell 75 and an output signal from the bridge circuit is obtained as previously described. Switch 255 remains closed and switch 260 remains open until capacitor 236 discharges through resistor 252 to a point at which the base 238 of transistor 240 is sufficiently negative with respect to emitter 242 so as to switch transistor 240 to its non-conducting state. Upon transistor 240 returning to its non-conducting state, capacitor 248 discharges through resistor 246 and solenoid 250 until the voltage across the terminal 250a and 250b of solenoid 250 is not sufficient to hold switch 255 closed and 260 open. Thus, selection of component values for capacitor 236 and resistors 234 and 235 determines the time period between successive firings of transistor 240 and the selection of values for capacitor 248 and 246 determines the time period during which a voltage is present between the electrodes 75a and 75b of the conductivity cell 75 after firing of transistor 240.

From the foregoing, numerous modifications to the present invention will be readily apparent to the artisan. Thus, it is our intent to be limited solely by the spirit and scope of the appended claims.

What is claimed is:

1. Apparatus for measuring the conductivity of a conductive medium, and for minimizing errors due to polarization, comprising:
   a. means for supplying AC electrical power having a frequency of approximately 60 hertz;
   b. switching means connected to said AC supply for periodically switching on and off the alternating current, said switching means operatively establishing a ratio of off to on time for said alternating current being switched on for less than one second during any one period;

c. means for sensing the conductivity of a medium, including a single conductivity cell having a pair of electrodes operable when energized to develop an output signal indicative of the conductivity of the medium; and d. means for connecting the output of the switching means to said single conductivity cell whereby AC power of about 60 hertz is intermittently applied according to the switching schedule established by said switching means to the conductivity cell for energization thereof.

2. Apparatus according to claim 1 wherein the switching means is adapted to switch the AC current on for a period of about 1/10 to 1/30 of a second, once every 8 to 12 seconds.

3. Apparatus for measuring the conductivity of an acqueous electrolyte solution, and for minimizing errors due to electrode polarization, comprising:

a. means for supplying AC electrical power having a frequency of approximately 60 hertz;

b. means for sensing the conductivity of an aqueous electrolyte solution, including a single conductivity cell having a pair of electrodes operable when energized to develop an output signal indicative of the conductivity of said solution; and c. electronic switching means operatively connected to said AC supply means and to said conductivity cell for periodically supplying AC current to said single conductivity cell for energization thereof, said switching means having an on time for energizing said conductivity cell of less than one second, and an off time of at least five times longer than said on time.

4. Apparatus according to claim 3 wherein said switching means is adapted to provide an on time of approximately 2 to 6 cycles of the power supply frequency.

5. Apparatus according to claim 4 wherein said switching means is adapted to provide an off time of approxmately 8 to 12 seconds between successive on times.

6. Apparatus according to claim 5 further including means connected to said conductivity cell for lengthening the output signals developed by said conductivity cell, so that the lengthened output signal is adequate to operate utilization apparatus.

* * * * *

UNITED STATES PATENT OFFICE
CERTIFICATE OF CORRECTION

PATENT NO. : 3,879,657
DATED : April 22, 1975
INVENTOR(S) : Marcus I. Nystuen; Roger A. Johnson It is certified that error appears in the above-identified patent and that said Letters Patent are hereby corrected as shown below:

In column 1, line 23, "electolyte" should be --electrolyte--.

In column 1, line 66, "operation" should be --operational--.

In column 5, line 23 "a resitor 85" should be --a resistor 86--.

In column 5, line 51, "pulsiing" should be --pulsing--.

In column 6, line 47, "lead 132" should be --lead 32--.

In column 8, line 15, "emitterbase" should be --emitter base--.

In column 10, line 23, "transistor to its" should read --transistor 240 to its--.

Signed and Sealed this seventh Day of October 1975

[SEAL]

Attest:

RUTH C. MASON
*Attesting Officer*

C. MARSHALL DANN
*Commissioner of Patents and Trademarks*